(12) United States Patent
Tarachandani et al.

(10) Patent No.: US 8,073,841 B2
(45) Date of Patent: Dec. 6, 2011

(54) OPTIMIZING CORRELATED XML EXTRACTS

(75) Inventors: Asha Tarachandani, Newark, CA (US); Sivasankaran Chandrasekar, Palo Alto, CA (US); Nipun Agarwal, Santa Clara, CA (US); Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 428 days.

(21) Appl. No.: 11/246,037

(22) Filed: Oct. 7, 2005

(65) Prior Publication Data

US 2007/0083809 A1    Apr. 12, 2007

(51) Int. Cl.
G06F 7/00 (2006.01)
G06F 17/30 (2006.01)
G06F 17/20 (2006.01)

(52) U.S. Cl. ......... 707/716; 707/767; 707/768; 715/210

(58) Field of Classification Search ................. 707/100, 707/3, 4, 102, 999.003, 1, 716, 767, 768, 707/999.104; 715/500, 239, 255–272, 234, 715/210
See application file for complete search history.

(56) References Cited

U.S. PATENT DOCUMENTS

| | | | |
|---|---|---|---|
| 4,993,025 A | 2/1991 | Vesel et al. | |
| 5,202,982 A | 4/1993 | Gramlich et al. | |
| 5,210,686 A | 5/1993 | Jernigan | |
| 5,226,137 A | 7/1993 | Bolan et al. | |
| 5,247,658 A | 9/1993 | Barrett et al. | |
| 5,257,366 A | 10/1993 | Adair et al. | |
| 5,295,256 A | 3/1994 | Bapat | |
| 5,295,261 A | 3/1994 | Simonetti | |
| 5,307,490 A | 4/1994 | Davidson et al. | |
| 5,313,629 A | 5/1994 | Abraham et al. | |
| 5,327,556 A | 7/1994 | Mohan et al. | |
| 5,369,763 A | 11/1994 | Biles | |
| 5,388,257 A | 2/1995 | Bauer | |
| 5,404,513 A | 4/1995 | Powers et al. | |
| 5,410,691 A | 4/1995 | Taylor | |
| 5,454,101 A | 9/1995 | Mackay et al. | |
| 5,463,772 A | 10/1995 | Thompson et al. | |
| 5,467,471 A | 11/1995 | Bader | |
| 5,499,371 A | 3/1996 | Henninger et al. | |
| 5,504,892 A | 4/1996 | Atsatt et al. | |
| 5,506,991 A | 4/1996 | Curry et al. | |
| 5,524,240 A | 6/1996 | Barbara et al. | |

(Continued)

FOREIGN PATENT DOCUMENTS

EP        856803 A2    8/1998

(Continued)

OTHER PUBLICATIONS

Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.

(Continued)

*Primary Examiner* — Mohammad Ali
*Assistant Examiner* — Bao Tran
(74) *Attorney, Agent, or Firm* — Hickman Palermo Truong & Becker LLP (57) ABSTRACT

Queries that request fields that are contained in the same XML fragments are written to execute them more efficiently.

18 Claims, 4 Drawing Sheets

U.S. PATENT DOCUMENTS

| | | |
|---|---|---|
| 5,530,849 A | 6/1996 | Hanushevsky et al. |
| 5,544,360 A | 8/1996 | Lewak et al. |
| 5,546,571 A | 8/1996 | Shan et al. |
| 5,561,763 A | 10/1996 | Eto et al. |
| 5,566,331 A | 10/1996 | Irwin, Jr. et al. |
| 5,568,640 A | 10/1996 | Nishiyama et al. |
| 5,574,915 A | 11/1996 | Lemon et al. |
| 5,625,815 A | 4/1997 | Maier et al. |
| 5,630,125 A | 5/1997 | Zellweger |
| 5,643,633 A | 7/1997 | Telford et al. |
| 5,680,614 A | 10/1997 | Bakuya et al. |
| 5,682,524 A | 10/1997 | Freund et al. |
| 5,684,990 A | 11/1997 | Boothby |
| 5,689,706 A | 11/1997 | Rao et al. |
| 5,701,467 A | 12/1997 | Freeston |
| 5,724,577 A | 3/1998 | Exley et al. |
| 5,734,887 A | 3/1998 | Kingberg et al. |
| 5,737,736 A | 4/1998 | Chang |
| 5,758,153 A | 5/1998 | Atsatt et al. |
| 5,802,518 A | 9/1998 | Karaev et al. |
| 5,819,275 A | 10/1998 | Badger et al. |
| 5,822,511 A | 10/1998 | Kashyap et al. |
| 5,832,526 A | 11/1998 | Schuyler |
| 5,838,965 A | 11/1998 | Kavanagh et al. |
| 5,842,212 A | 11/1998 | Balluvio et al. |
| 5,848,246 A | 12/1998 | Gish |
| 5,870,590 A | 2/1999 | Kita et al. |
| 5,878,415 A | 3/1999 | Olds |
| 5,878,434 A | 3/1999 | Draper et al. |
| 5,892,535 A | 4/1999 | Allen et al. |
| 5,897,632 A | 4/1999 | Dar et al. |
| 5,905,990 A | 5/1999 | Inglett |
| 5,915,253 A | 6/1999 | Christiansen |
| 5,917,492 A | 6/1999 | Bereiter et al. |
| 5,918,225 A | 6/1999 | White et al. |
| 5,921,582 A | 7/1999 | Gusack |
| 5,937,406 A | 8/1999 | Balabine et al. |
| 5,940,591 A | 8/1999 | Boyle et al. |
| 5,960,194 A | 9/1999 | Choy et al. |
| 5,964,407 A | 10/1999 | Sandkleiva |
| 5,974,407 A | 10/1999 | Sacks |
| 5,978,791 A | 11/1999 | Farber et al. |
| 5,983,215 A | 11/1999 | Ross et al. |
| 5,987,506 A | 11/1999 | Carter et al. |
| 5,991,771 A | 11/1999 | Falls et al. |
| 5,999,936 A | 12/1999 | Pattison et al. |
| 5,999,941 A | 12/1999 | Andersen |
| 6,003,040 A | 12/1999 | Mital et al. |
| 6,012,067 A | 1/2000 | Sarkar |
| 6,018,747 A | 1/2000 | Burns et al. |
| 6,023,706 A | 2/2000 | Schmuck et al. |
| 6,023,765 A | 2/2000 | Kuhn |
| 6,029,160 A | 2/2000 | Cabrera et al. |
| 6,029,166 A | 2/2000 | Mutalik et al. |
| 6,029,175 A | 2/2000 | Chow et al. |
| 6,038,563 A | 3/2000 | Bapat et al. |
| 6,052,122 A | 4/2000 | Sutcliffe et al. |
| 6,055,544 A | 4/2000 | DeRose et al. |
| 6,061,684 A | 5/2000 | Glasser et al. |
| 6,088,694 A | 7/2000 | Burns et al. |
| 6,092,086 A | 7/2000 | Martin et al. |
| 6,101,500 A | 8/2000 | Lau |
| 6,111,578 A | 8/2000 | Tesler |
| 6,112,209 A | 8/2000 | Gusack |
| 6,115,741 A | 9/2000 | Domenikos et al. |
| 6,119,118 A | 9/2000 | Kain, III et al. |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,185,574 B1 | 2/2001 | Howard et al. |
| 6,189,012 B1 | 2/2001 | Mital et al. |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmone |
| 6,212,512 B1 | 4/2001 | Barney et al. |
| 6,212,557 B1 | 4/2001 | Oran |
| 6,230,310 B1 | 5/2001 | Arrouye et al. |
| 6,233,729 B1 | 5/2001 | Campara et al. |
| 6,236,988 B1 | 5/2001 | Aldred |
| 6,240,407 B1 | 5/2001 | Chang et al. |
| 6,247,024 B1 | 6/2001 | Kincaid |
| 6,263,332 B1 | 7/2001 | Nasr et al. |
| 6,263,345 B1 | 7/2001 | Farrar et al. |
| 6,269,380 B1 | 7/2001 | Terry et al. |
| 6,269,431 B1 | 7/2001 | Dunham |
| 6,279,006 B1 | 8/2001 | Shigemi et al. |
| 6,279,007 B1 | 8/2001 | Uppala |
| 6,285,997 B1 | 9/2001 | Carey et al. |
| 6,298,349 B1 | 10/2001 | Toyoshima et al. |
| 6,301,605 B1 | 10/2001 | Napolitano et al. |
| 6,321,219 B1 | 11/2001 | Gainer et al. |
| 6,330,573 B1 | 12/2001 | Salisbury et al. |
| 6,339,382 B1 | 1/2002 | Arbinger et al. |
| 6,341,289 B1 | 1/2002 | Burroughs et al. |
| 6,343,287 B1 | 1/2002 | Kumar et al. |
| 6,349,295 B1 | 2/2002 | Tedesco et al. |
| 6,356,920 B1 | 3/2002 | Vandersluis |
| 6,363,371 B1 | 3/2002 | Chaudhuri et al. |
| 6,366,921 B1 | 4/2002 | Hansen et al. |
| 6,366,934 B1 | 4/2002 | Cheng et al. |
| 6,370,537 B1 | 4/2002 | Gilbert et al. |
| 6,370,548 B1 | 4/2002 | Bauer et al. |
| 6,389,427 B1 | 5/2002 | Faulkner |
| 6,389,433 B1 | 5/2002 | Bolosky et al. |
| 6,393,435 B1 | 5/2002 | Gartner et al. |
| 6,397,231 B1 | 5/2002 | Salisbury et al. |
| 6,418,448 B1 | 7/2002 | Sarkar |
| 6,421,658 B1 | 7/2002 | Carey et al. |
| 6,421,692 B1 | 7/2002 | Milne et al. |
| 6,427,123 B1 | 7/2002 | Sedlar |
| 6,438,540 B2 | 8/2002 | Nasr et al. |
| 6,438,550 B1 | 8/2002 | Doyle et al. |
| 6,438,562 B1 | 8/2002 | Gupta et al. |
| 6,442,548 B1 | 8/2002 | Balabine et al. |
| 6,446,091 B1 | 9/2002 | Noren et al. |
| 6,449,620 B1 | 9/2002 | Draper et al. |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,526,403 B1 | 2/2003 | Lin et al. |
| 6,529,901 B1 | 3/2003 | Chaudhuri et al. |
| 6,539,398 B1 | 3/2003 | Hannan et al. |
| 6,542,898 B1 | 4/2003 | Sullivan et al. |
| 6,571,231 B2 | 5/2003 | Sedlar |
| 6,574,655 B1 | 6/2003 | Libert et al. |
| 6,584,459 B1 | 6/2003 | Chang et al. |
| 6,594,675 B1 | 7/2003 | Schneider |
| 6,598,055 B1 | 7/2003 | Keesey et al. |
| 6,604,100 B1 | 8/2003 | Fernandez et al. |
| 6,609,121 B1 | 8/2003 | Ambrosini et al. |
| 6,611,843 B1 | 8/2003 | Jacobs |
| 6,615,203 B1 | 9/2003 | Lin et al. |
| 6,636,845 B2 | 10/2003 | Chau et al. |
| 6,643,633 B2 | 11/2003 | Chau et al. |
| 6,662,342 B1 | 12/2003 | Marcy |
| 6,675,230 B1 | 1/2004 | Lewallen |
| 6,681,221 B1 | 1/2004 | Jacobs |
| 6,684,227 B2 | 1/2004 | Duxbury |
| 6,697,805 B1 | 2/2004 | Choquier et al. |
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,721,723 B1 | 4/2004 | Gibson et al. |
| 6,725,212 B2 | 4/2004 | Couch et al. |
| 6,732,222 B1 | 5/2004 | Garritsen et al. |
| 6,754,661 B1 | 6/2004 | Hallin et al. |
| 6,772,350 B1 | 8/2004 | Belani et al. |
| 6,778,977 B1 | 8/2004 | Avadhanam et al. |
| 6,785,673 B1 | 8/2004 | Fernandez et al. |
| 6,795,821 B2 | 9/2004 | Yu |
| 6,801,224 B1 | 10/2004 | Lewallen |
| 6,826,568 B2 | 11/2004 | Bernstein et al. |
| 6,826,727 B1 | 11/2004 | Mohr et al. |

| | | |
|---|---|---|
| 6,836,778 B2 | 12/2004 | Manikutty et al. |
| 6,836,857 B2 | 12/2004 | Ten-Hove et al. |
| 6,871,204 B2 | 3/2005 | Krishnaprasad et al. |
| 6,901,403 B1 | 5/2005 | Bata et al. |
| 6,915,304 B2 | 7/2005 | Krupa |
| 6,920,457 B2 | 7/2005 | Pressmar |
| 6,947,927 B2 | 9/2005 | Chaudhuri et al. |
| 6,964,025 B2 | 11/2005 | Angiulo et al. |
| 7,031,956 B1 | 4/2006 | Lee et al. |
| 7,043,487 B2 | 5/2006 | Krishnamurthy et al. |
| 7,043,488 B1 | 5/2006 | Bauer et al. |
| 7,089,239 B1 | 8/2006 | Baer et al. |
| 7,113,936 B1 | 9/2006 | Michel et al. |
| 7,120,645 B2 | 10/2006 | Manikutty et al. |
| 7,139,746 B2 | 11/2006 | Shin et al. |
| 7,139,749 B2 | 11/2006 | Bossman et al. |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,174,328 B2 | 2/2007 | Stanoi et al. |
| 7,194,462 B2 * | 3/2007 | Riccardi et al. .................... 707/4 |
| 7,216,127 B2 | 5/2007 | Auerbach |
| 7,228,312 B2 | 6/2007 | Chaudhuri et al. |
| 7,315,852 B2 | 1/2008 | Balmin et al. |
| 7,386,568 B2 | 6/2008 | Warner et al. |
| 7,433,885 B2 | 10/2008 | Jones |
| 7,801,857 B2 * | 9/2010 | Betts et al. .................... 707/628 |
| 7,885,880 B1 * | 2/2011 | Prasad et al. .................... 705/35 |
| 2001/0037345 A1 | 11/2001 | Kiernan et al. |
| 2001/0049675 A1 | 12/2001 | Mandler et al. |
| 2002/0015042 A1 | 2/2002 | Robotham et al. |
| 2002/0035606 A1 | 3/2002 | Kenton |
| 2002/0038358 A1 | 3/2002 | Sweatt, III et al. |
| 2002/0056025 A1 | 5/2002 | Qiu et al. |
| 2002/0073019 A1 | 6/2002 | Deaton |
| 2002/0078068 A1 | 6/2002 | Krishnaprasad et al. |
| 2002/0087596 A1 | 7/2002 | Lewontin |
| 2002/0116371 A1 | 8/2002 | Dodds et al. |
| 2002/0116457 A1 | 8/2002 | Eshleman et al. |
| 2002/0120685 A1 | 8/2002 | Srivastava et al. |
| 2002/0123993 A1 | 9/2002 | Chau et al. |
| 2002/0124100 A1 | 9/2002 | Adams |
| 2002/0133484 A1 | 9/2002 | Chau et al. |
| 2002/0143512 A1 | 10/2002 | Shamoto et al. |
| 2002/0152267 A1 | 10/2002 | Lennon |
| 2002/0156772 A1 | 10/2002 | Chau et al. |
| 2002/0156811 A1 | 10/2002 | Krupa |
| 2002/0167788 A1 | 11/2002 | Vibet et al. |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0065659 A1 | 4/2003 | Agarwal et al. |
| 2003/0069881 A1 * | 4/2003 | Huttunen .................... 707/5 |
| 2003/0078906 A1 | 4/2003 | Ten-Hove et al. |
| 2003/0084056 A1 | 5/2003 | DeAnna et al. |
| 2003/0093672 A1 | 5/2003 | Cichowlas |
| 2003/0101194 A1 | 5/2003 | Rys et al. |
| 2003/0105732 A1 | 6/2003 | Kagalwala et al. |
| 2003/0131051 A1 | 7/2003 | Lection et al. |
| 2003/0140308 A1 * | 7/2003 | Murthy et al. ............. 715/500 |
| 2003/0158897 A1 | 8/2003 | Ben-Natan |
| 2003/0163519 A1 | 8/2003 | Kegel et al. |
| 2003/0167277 A1 | 9/2003 | Hejlsberg et al. |
| 2003/0172135 A1 | 9/2003 | Bobick et al. |
| 2003/0177341 A1 | 9/2003 | Devillers |
| 2003/0182276 A1 | 9/2003 | Bossman et al. |
| 2003/0182624 A1 | 9/2003 | Large |
| 2003/0212662 A1 | 11/2003 | Shin et al. |
| 2003/0212664 A1 | 11/2003 | Breining et al. |
| 2003/0226111 A1 | 12/2003 | Wirts et al. |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 * | 4/2004 | Manikutty et al. ........... 707/100 |
| 2004/0083209 A1 | 4/2004 | Shin |
| 2004/0088320 A1 | 5/2004 | Perry |
| 2004/0088415 A1 | 5/2004 | Chandrasekar et al. |
| 2004/0103105 A1 | 5/2004 | Lindblad et al. |
| 2004/0103282 A1 | 5/2004 | Meier et al. |
| 2004/0128296 A1 | 7/2004 | Krishnamurthy et al. |
| 2004/0143581 A1 | 7/2004 | Bohannon et al. |
| 2004/0148278 A1 | 7/2004 | Milo et al. |
| 2004/0163041 A1 | 8/2004 | Engel |
| 2004/0167864 A1 | 8/2004 | Wang et al. |
| 2004/0176958 A1 | 9/2004 | Salmenkaita et al. |
| 2004/0177080 A1 | 9/2004 | Doise et al. |
| 2004/0205551 A1 | 10/2004 | Santos |
| 2004/0210573 A1 | 10/2004 | Abe et al. |
| 2004/0215626 A1 | 10/2004 | Colossi et al. |
| 2004/0220912 A1 | 11/2004 | Manikutty et al. |
| 2004/0220927 A1 | 11/2004 | Murthy et al. |
| 2004/0220946 A1 | 11/2004 | Krishnaprasad et al. |
| 2004/0225680 A1 | 11/2004 | Cameron et al. |
| 2004/0230667 A1 | 11/2004 | Wookey |
| 2004/0230893 A1 | 11/2004 | Elza et al. |
| 2004/0236762 A1 | 11/2004 | Chaudhuri et al. |
| 2004/0255046 A1 | 12/2004 | Ringseth et al. |
| 2004/0260683 A1 | 12/2004 | Chan et al. |
| 2004/0267760 A1 | 12/2004 | Brundage et al. |
| 2004/0268244 A1 * | 12/2004 | Levanoni et al. ............. 715/514 |
| 2005/0004907 A1 | 1/2005 | Bruno et al. |
| 2005/0010896 A1 | 1/2005 | Meliksetian et al. |
| 2005/0027701 A1 | 2/2005 | Zane et al. |
| 2005/0038688 A1 | 2/2005 | Collins et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0065949 A1 | 3/2005 | Warner et al. |
| 2005/0091188 A1 | 4/2005 | Pal et al. |
| 2005/0097084 A1 * | 5/2005 | Balmin et al. .................... 707/3 |
| 2005/0120001 A1 | 6/2005 | Yagoub et al. |
| 2005/0120031 A1 | 6/2005 | Ishii |
| 2005/0138047 A1 | 6/2005 | Liu et al. |
| 2005/0203933 A1 | 9/2005 | Chaudhuri et al. |
| 2005/0228786 A1 | 10/2005 | Murthy et al. |
| 2005/0228791 A1 | 10/2005 | Thusoo et al. |
| 2005/0228792 A1 | 10/2005 | Chandrasekaran et al. |
| 2005/0228818 A1 | 10/2005 | Murthy et al. |
| 2005/0229158 A1 | 10/2005 | Thusoo et al. |
| 2005/0235048 A1 * | 10/2005 | Costa-Requena et al. .... 709/219 |
| 2005/0240624 A1 | 10/2005 | Ge et al. |
| 2005/0257201 A1 | 11/2005 | Rose et al. |
| 2005/0283614 A1 * | 12/2005 | Hardt ............................. 713/182 |
| 2005/0289125 A1 | 12/2005 | Liu et al. |
| 2005/0289175 A1 | 12/2005 | Krishnaprasad et al. |
| 2006/0021246 A1 | 2/2006 | Schulze et al. |
| 2006/0031204 A1 | 2/2006 | Liu et al. |
| 2006/0031233 A1 | 2/2006 | Liu et al. |
| 2006/0041537 A1 | 2/2006 | Ahmed |
| 2006/0074901 A1 * | 4/2006 | Pirahesh et al. .................... 707/5 |
| 2006/0101073 A1 * | 5/2006 | Popa et al. .................... 707/104.1 |
| 2006/0129524 A1 * | 6/2006 | Levanoni et al. .................... 707/1 |
| 2006/0129584 A1 | 6/2006 | Hoang et al. |
| 2006/0179068 A1 * | 8/2006 | Warner et al. .................... 707/100 |
| 2006/0212420 A1 | 9/2006 | Murthy |
| 2006/0212491 A1 | 9/2006 | Agrawal et al. |
| 2006/0224564 A1 | 10/2006 | Yu et al. |
| 2006/0224627 A1 | 10/2006 | Manikutty et al. |
| 2006/0235840 A1 | 10/2006 | Manikutty et al. |
| 2007/0011167 A1 | 1/2007 | Krishnaprasad et al. |
| 2007/0043696 A1 | 2/2007 | Haas et al. |
| 2007/0271305 A1 | 11/2007 | Chandrasekar et al. |
| 2008/0091623 A1 | 4/2008 | Idicula et al. |
| 2008/0222087 A1 | 9/2008 | Balmin et al. |
| 2010/0030726 A1 | 2/2010 | Chandrasekar et al. |
| 2010/0036825 A1 | 2/2010 | Chandrasekar |

FOREIGN PATENT DOCUMENTS

| | | |
|---|---|---|
| EP | 1 241589 A2 | 9/2002 |
| WO | WO 97/46956 | 12/1997 |
| WO | WO 00/14632 | 3/2000 |
| WO | WO 00/49533 A2 | 8/2000 |
| WO | WO 01/42881 A2 | 6/2001 |

| | | | |
|---|---|---|---|
| WO | WO 01/59602 A1 | 8/2001 | |
| WO | WO 01/61566 A1 | 8/2001 | |
| WO | WO 03/027908 A2 | 4/2003 | |
| WO | WO 03107576 | 12/2003 | |
| WO | WO 2006026534 | 3/2006 | |

OTHER PUBLICATIONS

Banerjee, Vishu Krishnamurthy et al., "Oracle8*i*—The XML Enabled Data Management System"—Oracle Corporation, Mar. 2000 IEEE pp. 561-568.

Bohannon, Philip, et al., "From XML Schema to Relations: A Cost-Based Approach to XML Storage"—Bell Laboratoriee, IEEE—2002—Proceedings of the 18th International Conference on Data Engineering (ICDE'02), 12 pages.

Bourret, R. et al.: A generic Load/Extract Utility for Data Transfer Between XML Documents and Relational Databases, Jun. 8-9, 2000, IEEE Computing SOC., pp. 134-143.

Braga, Daniele, et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Chakraborty, Krishnendu, "The XML Garbage Collector", The Source for Developers, Sun Developer Network Site XP-002297849, Mar. 2002.

Cheng, Josephine, et al., "IBM DB2 XML Extender, An end-to-end solution for storing and retrieving XML documents.," IEEE, ICDE '00 Conference, San Diego, Feb. 2000, 128 pages.

Choi, Byron et al., "The XQuey Formal Semantics: A Foundation for Implementation Optimization," May 31, 2002, IEEE XP-002353605, 15 pages.

Cooper, Brian F. et al., "A Fast Index for Semistructured Data,"Proceeding of the International Conference on Very Large Databases, 2001, XP-002303292, pp. 341-350.

Dayen, I., "Storing XML in Relational Databases", XML.com XP-002275971(1998-2004) pp. 1-13.

Diao, Y. et al., "Path Sharing and Predicate Evaluation for High-Performance XML Filtering"XP-002344354 *ACM Transactions on Database Systems* (2003), pp. 467-516.

Diao, Y. et al., "YFilter: Efficient and Scalable Filtering of XML Documents" *IEEE* (2002) 2 pages.

Drake, Mark et al., Oracle Corporation, "Understanding the Oracle9*i* XML Type," Nov. 1, 2001, http://otn.oracle.com/oramag/oracle/01-nov/o61xml.html?_template=/ocom/technology, data retrieved Jun. 29, 2004, pp. 1-5.

Funderbunk, J. et al., "XML programming with SQL/XML and XQuery", *IBM Systems Journal*, XP-002295973 (2002), pp. 642-665.

Gennick, Johnathan, Oracle Corporation,"SQL in, XML out," May 1, 2003, http://otn.oracle.com/oramag/oracle/03-may/o33xml.html?_template=/ocom/technology, data retrieved Jun. 29, 2004, pp. 1-4.

Helmer, S. et al., "Optimized Translations of XPath into Algebraic Expressions Parameterized by Programs Containing Navigational Primitives" *IEEE* (2002) 10 pages.

Higgins, Shelle, Oracle Corporation, "Oracle9*i*, Application Developer's Guide—XML," Release 1 (9.0.1), Jun. 2001, Part No. A88894-01, pp. 1-1,362.

Higgins, Shelley, Oracle Corporation, "Oracle9*i*, Case Studies-XML Applications," Release 1 (9.0.1), Jun. 2001, Part No. A88895-01, pp. 1-462.

Jajodia, Sushil, et al., "Toward a Multilevel Secure Relational Data Model," ACM, 1991, 8393 SIGMOD Record, 20 (1991) Jun. No. 2, New York, US.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.

Khan, Latifur, et al, "A Performance Evaluation of Storing XML Data in Relational Database Management Systems,"ACM-2001 (pp. 31-38).

Kudrass, Thomas, "Management of XML Documents Without Schema in Relational Database Systems," Information and Software Technology, vol. 44, No. 4, Mar. 31, 2002, XP-004347776, pp. 269-275.

Lo et al., "XAS: A System for Accessing Componentized, Virtual XML Documents," IEEE, 2001, pp. 493-502.

Manolescu, Dragos "Review of Metadata solutions: using metamodels, repositories, XML, and enterprise portals to generate information on demand by Adrienne Tannenbaum", Mar. 2003, ACM Press, vol. 28, Issue 2, p. 38.

McHugh, Jason et al., "Query Optimization for XML", XP-002333353, *Proceedings of the 25$^{th}$ VLDB Conference* (1999) pp. 315-326.

McHugh, Jason, et al. "Indexing Semistructured Data," Stanford Science Department, 1998, XP-002248313, pp. 1-21.

Melton, Jim, "ISO-ANSI Working Draft, XML-Related Specifications (SQL/XML)," WG3: DRS-020, H2-2002-365, Aug. 2002, 154 pages.

Murthy, Ravi et al., "XML Schemas in Oracle XML DB," Proceedings of the 29th VLDB Conference, 2003, IEEE XP-002353604, pp. 1009-1018.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Oracle, "Oracle iFS (Internet File System)," Mar. 1999, XP-002204710, 3 pages.

Oracle, "Oracle9*i* Application Server, Administrator's Guide," Release 2 (9.0.2), May 2002, Part No. A92171-02, Part No. A92171-02, pp. 1-392.

Oracle, "Oracle9*i* XML Database Developer's Guide—Oracle XML DB," Release 2 (9.2), Mar. 2002, Part No. A96620-1, pp. 5-8-5-10, 5-21-5-24, 5-52-5-70, 10-5-10-20 and 11-1-11-20.

Park, Joon S., "Towards Secure Collaboration on the Semantic Web" (2003) ACM Press, vol. 33, Issue 2, pp. 1-10.

Peng, Feng et al., "XPath queries on streaming data", 2003, ACM Press, pp. 431-442.

Ramakrishnan, Raghu et al., "SRQL: Sorted Relational Query Language", Jul. 1-3, 1998 IEEE pp. 84-95.

Rao, Herman Chung-Hwa, et al., "An Overview of the Internet File System," 1997, IEEE, XP-002204711, pp. 474-477.

Ricardo, Catherine, "Database Systems: Principles, Design, and Implementation," 1990, MacMillian Publishing Co., pp. 357-361, 379-380.

Schmidt et al., "Why and How to Benchmark XML Databases," SIGMOND Record, vol. 3, No. 3, Sep. 2001, pp. 27-32.

Shanmugasundaram, J., et al. "Querying XML Views of Relational Data," Proceedings of the 27$^{th}$ Very Large Databases Conference, Rome, Italy, Sep. 2001, pp. 261-270.

Thekkath, Chandramohan A. et al., "Implementing network protocols at user level" (1993) ACM Press, pp. 64-73.

Vion-Dury, Jean-Yves, "XPath on left and right sides of rules: toward compact XML tree rewriting through node patterns", 2003, ACM Press, pp. 19-25.

Vorthmann, S., et al. "Beyond Schemas, Schema Adjuncts and the Outside World," Markup Languages, Online!, vol. 2, No. 3, Jun. 2000, pp. 1-8.

W3C, "Extensible Markup Language (XML) 1.0 (Third Edition)", W3C Recommendation, dated Feb. 4, 2004, 34 pages.

W3C, "XML Fragment Interchange," W3C Working Draft, Jun. 30, 1999, XP002167090, 17 pages.

W3C, "XML Path Language (XPath) 2.0," W3C Recommendation, Working Draft, Oct. 29, 2004, retrieved from the internet<http://www.w3.org/TR/2004/WD-xpath20-20041029>, retrieved on Apr. 14, 2005, pp. 1-111.

W3C, "XML Path Language (XPath) 2.0," W3C Working Draft Dated Apr. 4, 2005, 89 pages.

W3C, "XML Schema Part 1: Structures," W3C Recommendation, May 2, 2001, http://www.w3.org/TR/2001/REC-xmlschema-1-20010502/, pp. 1-203.
W3C, "XML Schema Part 2: Datatypes," W3C Recommendation, May 2, 2001, http://www.w3.org/TR/2001/REC-xmlschema-2-20010502/, pp. 1-146.
W3C, "XML Syntax for XQuery 1.0 (XQueryX)," W3C Recommendation, Working Draft, Dec. 19, 2003, retrieved from the internet<http://www.w3.org/TR/2003/WD-xquery-20031219>, retrieved on Apr. 14, 2005, pp. 1-55.
W3C, "XQuery 1.0 and XPath 2.0 Data Model," W3C Working Draft dated Apr. 4, 2005, 91 pages.
W3C, "XQuery 1.0: An XML Query Language," W3C Recommendation, Working Draft, Oct. 29, 2004, retrieved from the internet<http://www.w3.org/TR/2004/WD-xquery-20041029>, retrieved on Apr. 14, 2005, pp. 1-189.
W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.
W3C, "XQuery 1.0: An XML Query Language," W3C Working Draft dated Apr. 4, 2005, 170 pages.
Wallach, Deborah A. et al., "ASHs: Application-specific handlers for high-performance messaging" (1996) ACM Press, pp. 1-13.
Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.
Zemke, Fred, "XMLQuery," Change Proposal, ISO/IEC JTC1/SC32 WG3:SIA-nnn ANSI NCITS H2-2004-02lrl, Mar. 14, 2004, 29 pages.
Zhang, Hui et al., "XQuery rewriting at the relational algebra level," Computer Systems Science and Engineering, vol. 18, No. 5, Sep. 2003, IEEE XP-009056809, pp. 241-262.
Zhang, Wansong, et al., "An Encoding Scheme for Indexing XML Data," E-Commerce and E-Service, 2004, XP-010697639, pp. 526-529.
Zisman et al., "Using XML to Build Consistency Rules for Distributed Specifications," Proceedings of the Tenth International Workshop on Software Specification and Design (IWSD'00), IEEE 2000, 8 pages.
MacKenzie, David et al., "Finding Files", GNU Findutils Version 4.1.2, Nov. 1994, 38 pages.
Girardot et al., "Millau: an encoding format for efficient representation and exchange of XML over the Web", IBM Almaden Research Center, 24 pages.
Shankar Pal et al., "Indexing XML Data Stored in a Relational Database", Proceedings of the 30$^{th}$ VLDB Conference, 2004, 12 pages.
Mackenzie et al., "Finding Files", FindUtils, Version 4.1.2, Source Code, GNU.org, Nov. 1997, source files, code. C, 22 pages.
Cormen et al., "Introduction to Algorithms", MIT Press, 2001, 2$^{nd}$ Edition, 4 pages.
European Patent Office, "Communication pursuant to Article 94 (3) EPC", European patent application 05732473.3-1225, dated Feb. 4, 2008, 7 pages.
State Intellectual Property Office of P.R.C., "Notification of the First Office Action", European patent application 2005800186273.9, dated Oct. 12, 2007, 9 pages.
Claims, European patent application 2005800186273.9, 3 pages.
Claims, European patent application 05732473.3-1225, 3 pages.
Microsoft Computer Dictionary, 2002, Microsoft Press, Fifth Edition, 3 pages.
Goldman, Roy, et al., "DataGuides: Enabling Query Formulation and Optimization in Semistructured Databases", The International Conference on Very Large Data Bases, 1997, 21 pages.
Lumpkin, George et al., Oracle Corporation, "Query Optimization in Oracle9i," An Oracle White Paper, Feb. 2002, 30 pages.
Oracle Corp., "Oracle9iDatabase Daily Feature, Oracle9i Optimizer Statistics Collection Enhancements," Apr. 23, 2003, http://otn.oracle.com/products/oracle9i/daily/apr23.html?_template=/ocom/technology/con , pp. 1-2.
Burleson, Donald K., Oracle Corporation, "Cost Control: Inside the Oracle Optimizer," 2003, http://otn.oracle.com/oramag/columns/2003/techarticles/burleson_cob_pt1.html, data retrieved Jul. 16, 2004, 15 pages.
Banerjee, Sandeepan, Oracle Corporation, "Oracle 9i 'Project XDB'—The XML Database," http://www.grandpoohbah.net/Sandeepan/IOUG2001XDB.htm, data retrieved Feb. 6, 2004, pp. 1-18.
Oracle Corp., "Resource_View and Path_View," Oracle9iXML Database Developer's Guide—Oracle XML DB, Release 2 (9.2), Part No. A96620-02, 2002, http://www.cs.utah.edu/classes/cs5530/oracle/doc/B10501_01/appdev.920/a99620/xdbl9res, data retrieved Feb. 6, 2004, pp. 1-13.
Halverson et al., "Mixed Mode XML Query Processing", Proceedings of the 29th VLDB Conference, Sep. 12-13, 2003, 12 pages.
Aboulnaga et al., "Building XML Statistics for the Hidden Web", Proceedings of the 28th VLDB Conference, 2002, 14 pages.
Oracle Corp., "Under_Path," Oracle9iSQL Reference, Release 2 (9.2), Part No. A96540-01, 1996, 2002, http://www.lc.leidenuniv.nl/awcourse/oracle/server.920/a96540/conditions12a.htm, data retrieved Feb. 6, 2004, 8 pages.
Jagadish et al., "Timber: A Native XML Database", The VLDB Journal, published online Dec. 19, 2002, 18 pages.
Feng Peng and Sudarshan S. Chawathe, "XPath Queries on Streaming Data" (Proceedings of the 2003 ACM SIGMOND International Conference on Management of Data), pp. 431-442.
Krishnaprasad et al., "Query Rewrite for XML in Oracle XML DB," Proceedings of the 30$^{th}$ VLDB Conference, 2004, 12 pages.
U.S. Appl. No. 12/189,007, filed Aug. 8, 2008, Office Action, Nov. 3, 2010.
U.S. Appl. No. 12/181,725, filed Jul. 29, 2008, Office Action, Nov. 16, 2010.
European Patent Office, "Communication Pursuant to Article 96(2) EPC," EP App. No. 02799692.5, dated Jan. 18, 2006, 5 pages.
Current Claims PCT/US02/31168, EP App. No. 02799692.5, 8 pages.

\* cited by examiner

```
Q select   extractvalue(value(t), '/person/profile/education'),
         extractvalue(value(t), '/person/profile/business')
from     auction_t X,
         table(XMLSequence(extract(X.doc, '/site/people/person'))) t
where    X.id = 1;
```

```
Q',
select   max(decode(elemname, 'education', elemvalue)) "education",
         max(decode(elemname, 'business', elemvalue)) "business",
from
        (select newt.getrootelement() elemname,
                extractvalue(value(newt), "." elemvalue,
                value(t) t                                              ──── Q'_SUB
         from
                auction_t X,
                table(XMLSequence(extract(X.doc, '/site/people/person'))) t
                table(XMLSequence(extract(value(t), 'person/profile/*') newt
         where X.id = 1;
         )
group by sys_xmldodeid_getokey(t)
```

OPTIMIZING CORRELATED XML EXTRACTS

RELATED APPLICATIONS

This application is related to U.S. patent application Ser. No. 10/428,878, entitled Techniques For Rewriting XML Queries Directed To Relational Database Constructs, filed by Anand Manikutty, et al. on May 1, 2003, referred to hereafter as the "Rewrite Application", the contents of which are incorporated herein by reference as if originally set forth herein.

This application is related to U.S. application Ser. No. 10/884,311, entitled Index For Accessing XML Data, hereafter referred to as the "XML Index Application", filed on July 2, 2004 by Sivasankaran Chandrasekar, the contents of which are herein incorporated by reference in their entirety for all purposes.

FIELD OF THE INVENTION

The present invention relates to executing queries that request XML data, and in particular, rewriting such queries to optimize their computation and/or execution.

BACKGROUND

The Extensible Markup Language (XML) is the standard for data and documents that is finding wide acceptance in the computer industry. XML describes and provides structure to a body of data, such as a file or data packet, referred to herein as a XML entity. The XML standard provides for tags that delimit sections of a XML entity referred to as XML elements. Each XML element may contain one or more name-value pairs referred to as attributes. The following XML Segment A is provided to illustrate XML.

---
SEGMENT A

```
<book>My book
    <publication publisher="Doubleday"
        date="January"></publication>
    <Author>Mark Berry</Author>
    <Author>Jane Murray</Author>
</book>
```
---

XML elements are delimited by a start tag and a corresponding end tag. For example, segment A contains the start tag <Author> and the end tag </Author> to delimit an element. The data between the elements is referred to as the element's content. In the case of this element, the content of the element is the text data Mark Berry.

Element content may contain various other types of data, which include attributes and other elements. The book element is an example of an element that contains one or more elements. Specifically, book contains two elements: publication and author. An element that is contained by another element is referred to as a descendant of that element. Thus, elements publication and author are descendants of element book. An element's attributes are also referred to as being contained by the element.

By defining an element that contains attributes and descendant elements, the XML entity defines a hierarchical tree relationship between the element, its descendant elements, and its attribute. A root node and a set of elements that descend from the root node are referred to herein as a XML document.

XML Data Models

An important standard for XML is the XQuery 1.0 and XPath 2.0 Data Model. (see W3C Working Draft, 29 Oct. 2004), which is incorporated herein by reference and referred to hereinafter as the XQuery Data Model.

One aspect of XQuery Data Model is that XML data is represented by a hierarchy of nodes that reflects the hierarchical nature of the XML data. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes. In a tree hierarchy or node tree, each child node has only one parent node, but a parent node may have multiple child nodes. In a tree hierarchy, a node that has no parent node linked to it is the root node, and a node that has no child nodes linked to it is a leaf node. A tree hierarchy has a single root node.

In a node tree that represents a XML document, a node can correspond to an element, the child nodes of the node correspond to an attribute or another element contained in the element. The node may be associated with a name and value. For example, for a node tree representing the element book, the name of the node associated with element book is book, and the value is 'My book'. For a node representing the attribute publisher, the name of the node is publisher and the value of the node is 'Doubleday'.

For convenience of expression, elements and other parts of a XML document are referred to as nodes within a tree of nodes that represents the document. Thus, referring to 'My book' as the value of the node with name book is just a convenient way of expressing the value of the element associated with node book is My book.

A XML fragment is a portion of a XML document. A XML fragment can be a subtree within a XML document. A XML fragment may also be an attribute, an element, or a XML sequence ("sequence") of elements that descend from parent node but does not include the parent node.

Finally, the term XML value is used herein to refer to any value stored or represented by a XML document or parts thereof. A XML value may be a scalar value, such as the string value of an element and the numeric value of an attribute-value pair; a XML value may be a XML fragment, or a XML document. The term XML value refers to any value represented by the XQuery Data Model.

XML Storage and Query Mechanisms

Various types of storage mechanisms are used to store a XML document. One type of storage mechanism stores a XML document as a text file in a file system.

Another type of storage mechanism uses object-relational database systems that have been enhanced to store and query XML values. In an embodiment, a XML document is stored in a row of a table and nodes of the XML document are stored in separate columns in the row. An entire XML document may also be stored in a lob (large object). A XML document may also be stored as a hierarchy of objects in an object-relational database; each object is an instance of an object class and stores one or more elements of a XML document. The object class defines, for example, the structure corresponding to an element, and includes references or pointers to objects representing the immediate descendants of the element. Tables and/or objects of a database system that hold XML values are referred to herein as base tables or objects.

It is important for object-relational database systems that store XML values to be able to execute queries using XML query languages, such as XQuery/XPath. XML Query Language ("XQuery") and XML Path Language ("XPath") are important standards for a query language, which can be used in conjunction with SQL to express a large variety of useful queries. XPath is described in XML Path Language (XPath), version 1.0 (W3C Recommendation 16 Nov. 1999), which is incorporated herein by reference. XPath 2.0 and XQuery 1.0 are described in XQuery 1.0 and XPath 2.0 Full-Text. (W3C Working Draft 9 Jul. 2004), which is incorporated herein by reference.

Queries that request XML values often request multiple XML values from the same XML document or fragment. However, the computation of such a query is performed in a way such that, for the particular row that holds the requested XML document or fragment, the row is accessed multiple times, once for each of the multiple XML values of the XML document. The following query QB is provided as an illustration.

```
select
    extract (po, '/PurchaseOrder/Pono'),
    extract (po, '/PurchaseOrder/BillingAddress'),....
    from po_table;
```

Each row in base table po_table holds a XML document. For each such document, the row that contains the XML document is accessed for each of the Extract function invocations in query QB.

Based on the foregoing, there is a need for a more efficient approach for computing queries that request XML values from a XML document.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in the BACKGROUND section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques that can optimize and reduce database accesses incurred to compute queries that request fields that are correlated. A field is an element (including a complex element), element attribute, object, object attribute, or column whose values are requested by a database query. In an embodiment, the fields requested are referenced or declared in the select-list of a database query that conforms to a standard of SQL, such as SQL/XML as defined (INCITS/ISO/IEC 9075-14:2003, which is incorporated herein by reference). However, an embodiment of the present invention is not limited to a particular standard of SQL, including a non-proprietary standard or a proprietary standard, examples of latter being those supported by database server products of Oracle corporation.

A database query may request a field by declaring that the field's values are part of the results of the query; for example, a database query may simply reference a column's name in the select-list. A database query may request a field by specifying that the field is an input to a function whose output is declared to part of the results requested by the database query. A database query may request an element as a field by requesting the element via an SQL/XML operator; such as the extract function.

Correlated fields are fields whose values are contained in the same XML fragment, that is, their values can be retrieved or derived from the same source XML fragment. Such a XML fragment is referred to herein as a "common source fragment" with respect to the correlated fields. For a given query, groups of correlated fields are determined, and the query is rewritten to generate and access a new and different data source for the correlated fields, referred to herein as a correlated field source. The correlated field source can be computed and/or accessed with less database accesses.

Figure 1:
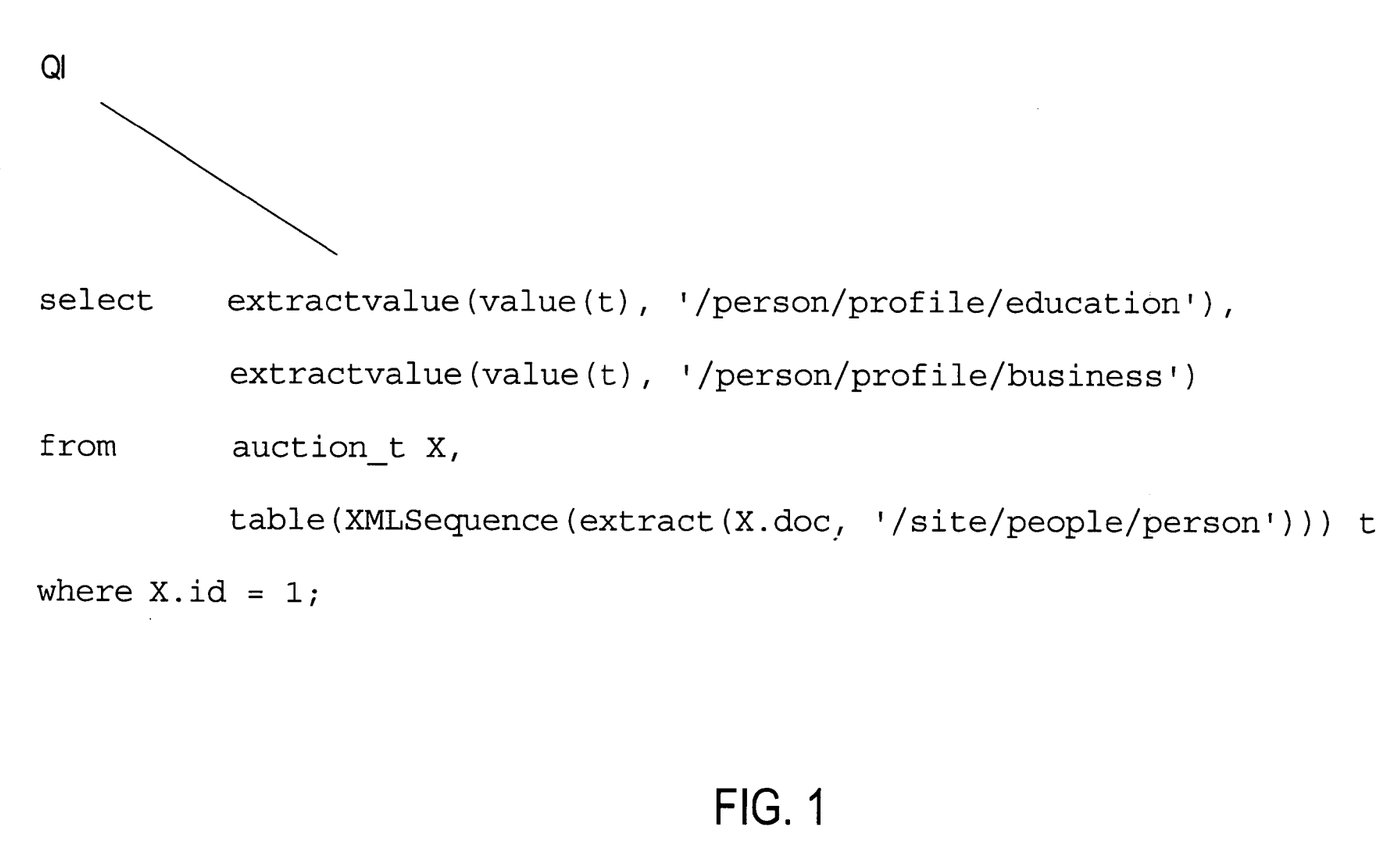
FIG. 1 is a diagram of a query that requests multiple fields contained in the same XML fragment according to an embodiment of the present invention.

FIG. 1 depicts a query QI, which is provided to illustrate correlated fields and techniques for rewriting queries described later herein. Query QI requests fields from table auction_t. For purposes of illustration, each row of auction_t contains a XML document.

Query QI requests two fields: elements education and business, which correspond, respectively, to select-list expressions extractvalue (value (t) '/person/profile/education') and extractvalue(value(t), '/person/profile/business'). These fields descend from and are thus contained in the same element /site/people/person/profile. The two fields are correlated fields because, for a given XML document stored in auction_t, the values for the two fields can be retrieved from a common source fragment.

To reduce database accesses, a query is rewritten to generate a correlated field source that contains all field values of an XML fragment, or at least more fields values than just those of the correlated fields. For a given a set of correlated fields, a common source fragment may contain more fields than are in the set, in fact, many more than are in the set. It is possible that more computer resources may be expanded to generate the correlated field source than are saved by a reduction in database accesses. To determine whether to rewrite a query to use a correlated field source, "rewrite criterion" is used. A rewrite criterion is a criterion that is used to determine whether to rewrite a query. A rewrite criterion may, for example, indicate when the cost expended to compute a correlated field source that contains the fields of a common source fragment exceed those of incurring a database access for each of the correlated fields. Rewrite criteria can be based on heuristics. In general, if the number of correlated fields in a database query constitutes a sufficiently large threshold portion of the total number fields in the corresponding common source fragment, then the savings realized by rewriting are greater and rewrites is merited.

For example, assume for a database query that M is the number of correlated fields for a common source fragment. For the common source fragment in query QI, M is 2.

Further assume that N is the total number of fields in a common source fragment that corresponds to the correlated fields. If the XML documents stored auction_t include four elements (without any attributes) in element '/site/people/person', then N is four.

If a correlated field source is generated and used to retrieve the correlated fields, then one database row is accessed to generate the correlated field source for each common source fragment, assuming that the common source fragment or its document are completely stored in the row. Without rewriting to use the correlated field source, a database access can be accessed M times. In the case of query QI, a row in auction_t that stores a common source fragment is accessed twice.

The ratio of M/N reflects what portion of a common source fragment the correlated fields constitute. The M/N ratio is the current example is 0.5. If however, descendant elements /site/people/person/profile' included attributes such that N is equal to 20, then the M/N ratio is lower at 0.1.

In general, the higher the M/N ratio, the greater savings potential of a correlated field source rewrite. In an embodiment of the present invention, a ratio of M/N that is 0.5 or greater may satisfy rewrite criteria. A ratio as low as 0.1 may not.

Illustrative Embodiment

According to an embodiment of the present invention, database queries are received by a database system and rewritten to generate a correlated field source cause and retrieve correlated field values from the correlated field source. A database system typically comprises one or more clients that are communicatively coupled to a server that is connected to a shared database. "Server" may refer collectively to a cluster of server instances and machines on which the instances execute. Generally, a server is a combination of integrated software components and an allocation of computational resources, such as memory, a node, and processes on the node for executing the integrated software components on a processor, where the combination of the software and computational resources are dedicated to providing a particular type of function on behalf of clients of the server. Among other functions of database management, a database server governs and facilitates access to a particular database, processing requests by clients to access the database.

A database server retrieves and manipulates data in response to receiving a database statement. Typically, the database statement conforms to a database language, such as SQL. A database statement can specify a query operation, a data manipulation operation, or a combination thereof. For some, only database statements that specify a query operation are referred to as a database query. As the term is used herein, a database query is not limited to database statements that specify a particular type of operation. Database queries include those that specify data manipulation operations.

A database comprises data and metadata that is stored on a persistent memory mechanism, such as a set of hard disks. Such data and metadata may be stored in a database logically, for example, according to relational and/or object-relational database constructs.

When performing a database access to access a data item from a persistent memory mechanism, the data item is read into a buffering system in the shared volatile and/or virtual memory of a database system. Subsequent accesses to the data may be made by accessing the data in the buffering system with or without having to first read the data from the persistent storage mechanism. Thus, a database access, as the term is used herein, may or may not entail an access to a persistent storage access mechanism and but may only entail access to buffering system. It should be noted that even without having to read from a persistent memory mechanism to perform a database access, access to a buffering system itself can entail significant overhead in the form of, for example, contention processing to manage access to data in the buffering system.

When the database system stores a XML document in a database, it generates statistics about the XML document and XML fragments contained therein. Such statistics may include, for example, information that indicates the number fields in a particular set of XML fragments of a set of XML documents, or fan-out, the number of descendants of various elements or number siblings within levels of the XML documents.

When a database system receives a query, a query engine parses the database query and determines how it can be optimized and executed. Optimization includes rewriting a database query to generate a rewritten query that is equivalent that can be executed more efficiently. Queries are equivalent if their computation yields equivalent results. The following procedure is followed by a database server to determine whether and how to rewrite a database query to produce a rewritten query that materializes a source XML document and retrieves correlated field values there from.

Procedure for Query Rewrite

Figure 2:
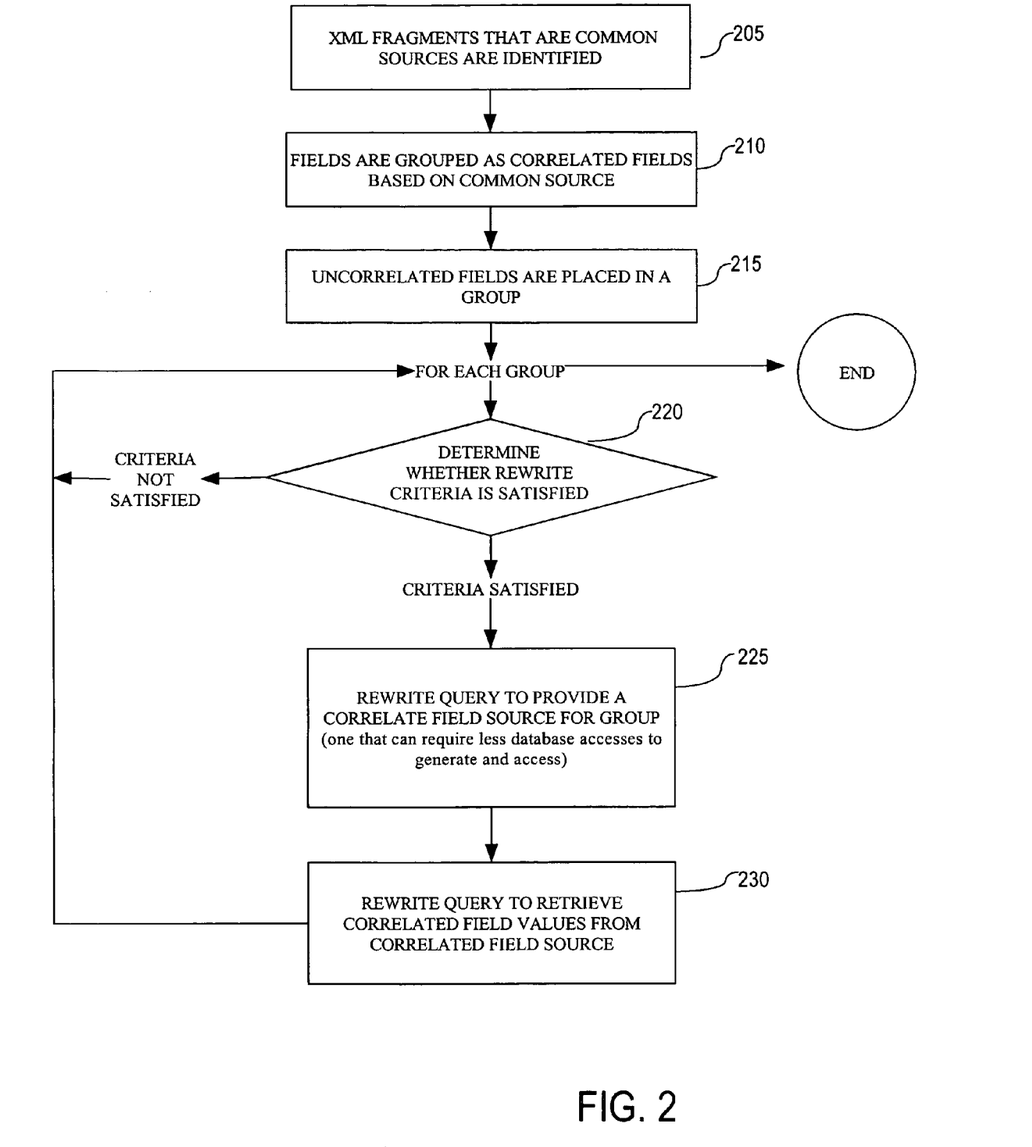
FIG. 2 is a flow chart of a procedure for rewriting a query according to an embodiment of the present invention.

FIG. 2 shows a procedure for rewriting a query. The procedure is illustrated using rewritten query QI and QI', shown in FIG. 3.

At step 205, XML fragments that are a common source fragment for correlated fields are identified. In query QI, the element '/person/profile/' is identified as a common source fragment for the pair of elements 'education' and 'business'.

At step 210, fields are grouped as correlated fields based on common source fragments. At step 215, fields that have not been correlated to a common source fragment ("uncorrelated field") are grouped into another group. In the current example, elements 'education' and 'business' share a common source and are therefore grouped together as correlated fields.

For each group of correlated fields, at step 220 it is determined whether rewrite criteria are satisfied. If the rewrite criteria are satisfied, then steps 225 and 230 are performed for that group. For purposes of illustration, the group of correlated fields consisting of elements 'education' and 'business' satisfy rewrite criteria.

At step 225, query rewrite operations are performed to provide for the group a correlated field source that can require less database accesses to compute. At step 230, query rewrite operations are performed so that the correlated field values are retrieved from the correlated field source.

Figure 3:
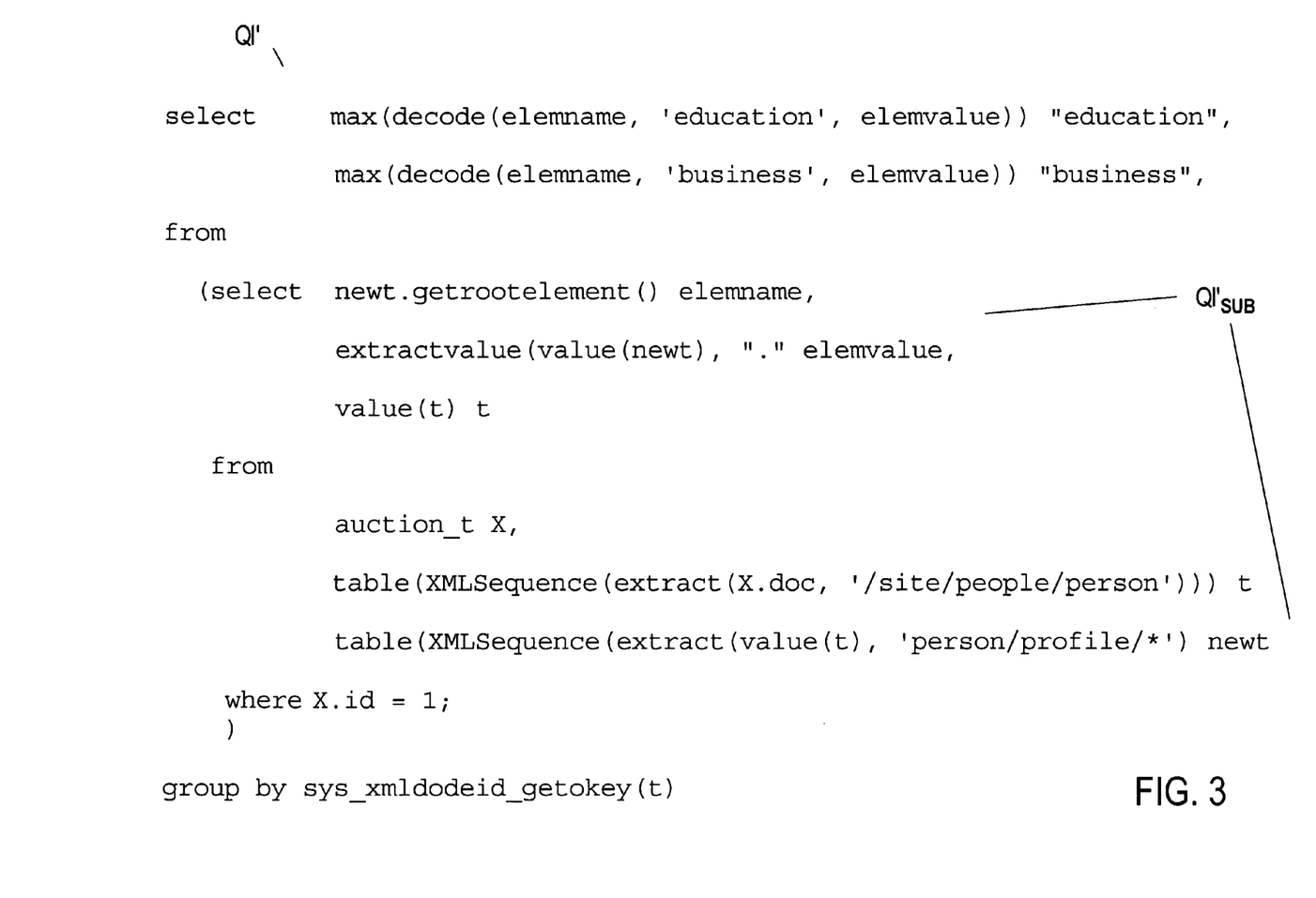
FIG. 3 is a diagram of a query produced by the procedure depicted in FIG. 2 according to an embodiment of the present invention.

In the current example, query QI is rewritten to query QI' as shown in FIG. 3. The from-list of query QI has been rewritten to specify a correlated field source in the form of the result set of subquery $QI'_{sub}$. The result set includes name-value pairs, i.e. an elements name and value in each row of the result set. In the result set, columns elemname and elemvalue correspond to the element name and element value of the name and value of the name-value pairs, respectively.

The select-list of query of QI' has also been modified to access these columns and retrieve the correlated fields from the result set. The result set is stored as interim data during the computation of QI'$_{sub}$, typically in volatile memory, and can be accessed without entailing a database access.

The function sys_xmlnode_getokey ( ) of the group by clause returns an "order key", which is a value representing the hierarchical position of a node in an XML document. For example, if a node is the 3rd child of the 5th child of the root, its order key is 1.5.3. Further details about order keys may be found in XML Index Application.

For a common source fragment having values in the result set, all field values of common source fragment are stored as name-value pairs in the result set, including fields not requested by the select-list of query QI. Even though all these fields are generated and stored, the field values were computed with less database accesses per common source fragment.

According to an embodiment, the new data source for a database query may be computed more efficiently when common source fragments accessed are indexed by a XML index. One such index is the XML index described in XML Index Application, which indexes nodes in each XML document of a XML collection.

After executing the procedure depicted in FIG. 2, the database query may be further rewritten to further optimize its execution. Such rewriting can include rewriting operations described in the Rewrite Application. During such rewrites, XQuery/XPath queries received by a database server that specify XQuery/XPath operations are dynamically rewritten into object-relational queries that directly reference and access the underlying base tables that store XML documents. Specific techniques for implementing the rewrite approach are described in the Rewrite application.

Hardware Overview

Figure 4:
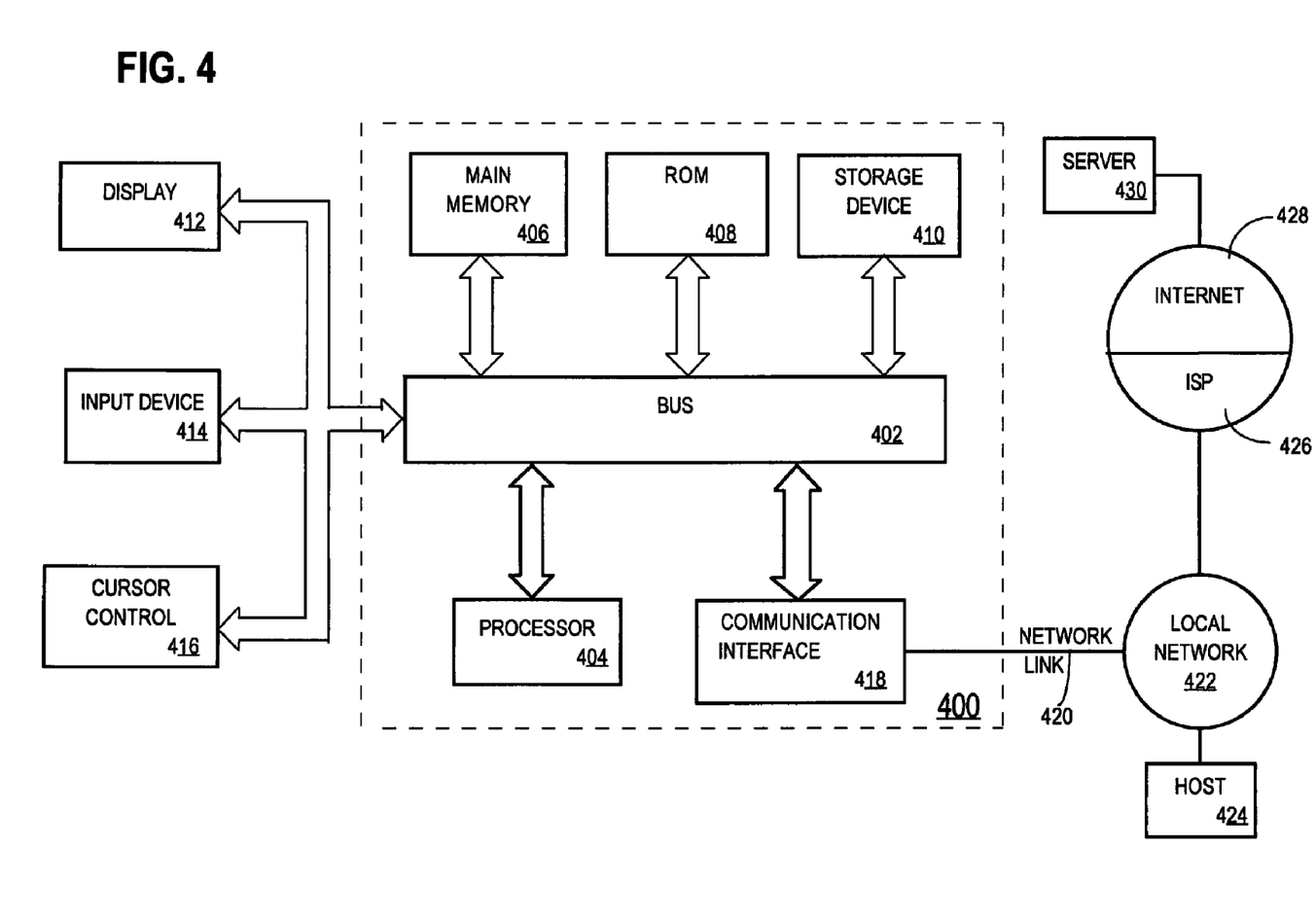
FIG. 4 is a block diagram of computer system used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   evaluating a first database query that requests a plurality of requested fields from one or more XML documents stored in a database;
   wherein said query requests a respective value for each requested field of the plurality of requested fields and includes an XPATH expression that identifies said each requested field;
   wherein the evaluating includes:
      identifying the plurality of requested fields as correlated fields of a common XML fragment, the respective value of each requested field of said plurality of requested fields being contained within said common XML fragment; and
      determining whether one or more rewrite criteria are satisfied based on the correlated fields; and
   if said one or more rewrite criteria are satisfied, then rewriting said first database query to generate a rewritten query that includes a new data source that contains field values from said common XML fragment, wherein the field values from said common XML fragment include the respective value of said each requested field and at least one field value not requested by said database query;
   wherein the method is performed by one or more computing devices.

2. The method of claim 1, wherein the new data source includes name-value pairs that represent said certain values.

3. The method of claim 1, wherein the first database query conforms to a standard of SQL.

4. The method of claim 1, wherein the first database query includes a select-list that references said correlated fields but not said at least one field value.

5. The method of claim 1, wherein:
   the first database query requests another field as part of the results to compute for the first database query; and
   wherein the rewritten query specifies a second data source, different than said new data source, for said another field.

6. The method of claim 1, wherein:
   said database includes an index that indexes nodes of a collection of XML documents; and
   wherein execution of the rewritten query uses said index to access said XML documents.

7. The method of claim 1, wherein rewriting said first database query includes rewriting said first database query to access base tables in the database that store XML documents.

8. The method of claim 1, wherein determining whether one or more rewrite criteria is satisfied is based on statistics generated about XML documents stored in the database.

9. The method of claim 1, wherein determining whether one or more rewrite criteria is satisfied is based on the number of correlated fields and a number of fields contained in said XML fragment.

10. A non-transitory machine-readable storage medium storing one or more sequences of instructions which, when executed by one or more processors, causes the one or more processors to perform the following steps:
    evaluating a first database query that requests a plurality of requested fields from one or more XML documents stored in a database;
    wherein
       said query requests a respective value for each requested field of the plurality of requested fields and includes an XPATH expression that identifies said each requested field;
    wherein the evaluating includes:
       identifying the plurality of requested fields as correlated fields of a common XML fragment, the respective value of each requested field of said plurality of requested fields being contained within said common XML fragment; and
       determining whether one or more rewrite criteria are satisfied based on the correlated fields; and
       if said one or more rewrite criteria are satisfied, then rewriting said first database query to generate a rewritten query that includes a new data source that contains field values from said common XML fragment, wherein the field values from said common XML fragment include the respective value of said each requested field and at least one field value not requested by said database query.

11. The machine-readable storage medium of claim 10, wherein the new data source includes name-value pairs that represent said certain values.

12. The machine-readable storage medium of claim 10, wherein the first database query conforms to a standard of SQL.

13. The machine-readable storage medium of claim 10, wherein the first database query includes a select-list that references said correlated fields but not said at least one field value.

14. The machine-readable storage medium of claim 10, wherein:
 the first database query requests another field as part of the results to compute for the first database query; and
 wherein the rewritten query specifies a second data source, different than said new data source, for said another field.

15. The machine-readable storage medium of claim 10, wherein:
 said database includes an index that indexes nodes of a collection of XML documents; and
 wherein execution of the rewritten query uses said index to access said XML documents.

16. The machine-readable storage medium of claim 10, wherein rewriting said first database query includes rewriting said first database query to access base tables in the database that store XML documents.

17. The machine-readable storage medium of claim 10, wherein determining whether one or more rewrite criteria is satisfied is based on statistics generated about XML documents stored in the database.

18. The machine-readable storage medium of claim 10, wherein determining whether one or more rewrite criteria is satisfied is based on the number of correlated fields and a number of fields contained in said XML fragment.

\* \* \* \* \*

UNITED STATES PATENT AND TRADEMARK OFFICE
CERTIFICATE OF CORRECTION

PATENT NO. : 8,073,841 B2
APPLICATION NO. : 11/246037
DATED : December 6, 2011
INVENTOR(S) : Tarachandani et al.

It is certified that error appears in the above-identified patent and that said Letters Patent is hereby corrected as shown below:

On Title page 4, item (56), in column 1, under "Other Publications", line 5, delete "Laboratoriee," and insert -- Laboratories, --, therefor.

On Title page 4, item (56), in column 1, under "Other Publications", line 25, delete "XQuey" and insert -- XQuery --, therefor.

On Title page 4, item (56), in column 2, under "Other Publications", line 49, delete "MacMillian" and insert -- MacMillan --, therefor.

On Title page 5, item (56), in column 2, under "Other Publications", line 41, delete "SIGMOND" and insert -- SIGMOD --, therefor.

In column 4, line 43, delete "(t)" and insert -- (t), --, therefor.

Signed and Sealed this
Thirteenth Day of March, 2012

David J. Kappos
*Director of the United States Patent and Trademark Office*